United States Patent [19]

Collins

[11] 3,911,729

[45] Oct. 14, 1975

[54] SHEAR WAVE ACOUSTICAL HOLOGRAPHY

[75] Inventor: H. Dale Collins, Richland, Wash.

[73] Assignee: Holosonics, Inc., Richland, Wash.

[22] Filed: July 16, 1973

[21] Appl. No.: 379,344

[52] U.S. Cl. ............... 73/67.5 H; 340/5 H; 350/3.5
[51] Int. Cl.[2] .......................................... G03H 3/00
[58] Field of Search ........... 73/67.5 H, 67.6, 67.5 R; 340/5 H, 3 R; 181/.5 NP; 350/3.5

[56] References Cited
UNITED STATES PATENTS

| | | | |
|---|---|---|---|
| 3,340,953 | 9/1967 | Zemanek | 181/.5 |
| 3,512,400 | 5/1970 | Lynnworth | 73/67.5 R |
| 3,561,257 | 2/1971 | Brenden | 73/67.5 H |
| 3,658,403 | 4/1972 | Greenaway et al. | 350/3.5 |
| 3,666,884 | 5/1972 | Chambers et al. | 350/3.5 X |
| 3,678,452 | 7/1972 | Silverman | 73/67.5 H |
| 3,720,098 | 3/1973 | Dixon | 73/67.7 |
| 3,764,216 | 10/1973 | Bliek et al. | 350/3.5 X |

OTHER PUBLICATIONS

Leith et al., Investigation of Holographic Test in Techniques, Feb. 1971.

Journal of Association for Advancement of Med. Instr., "Symposium Summary: Acoustic Holography," pgs. 261–266, Vol. 5, No. 5, Sept.–Oct. 1971.

*Primary Examiner*—Richard C. Queisser
*Assistant Examiner*—Stephen A. Kreitman
*Attorney, Agent, or Firm*—Wells, St. John & Roberts

[57] ABSTRACT

A method is described for producing acoustical holographic information of an object such as a discontinuity or defect contained in solid material and for producing an optical image of the object. This is accomplished by scanning a focused acoustical transducer that is directed while being scanned at a selected incidence angle with respect to a surface of the solid material to receive only shear wave radiation scattered by the object and refracted by the surface. From the received holographic information a shear wave hologram is formed. A coherent light beam is directed through the hologram to produce an optical image of the object. To reduce image aberrations, the hologram is tilted with respect to the light beam.

9 Claims, 5 Drawing Figures

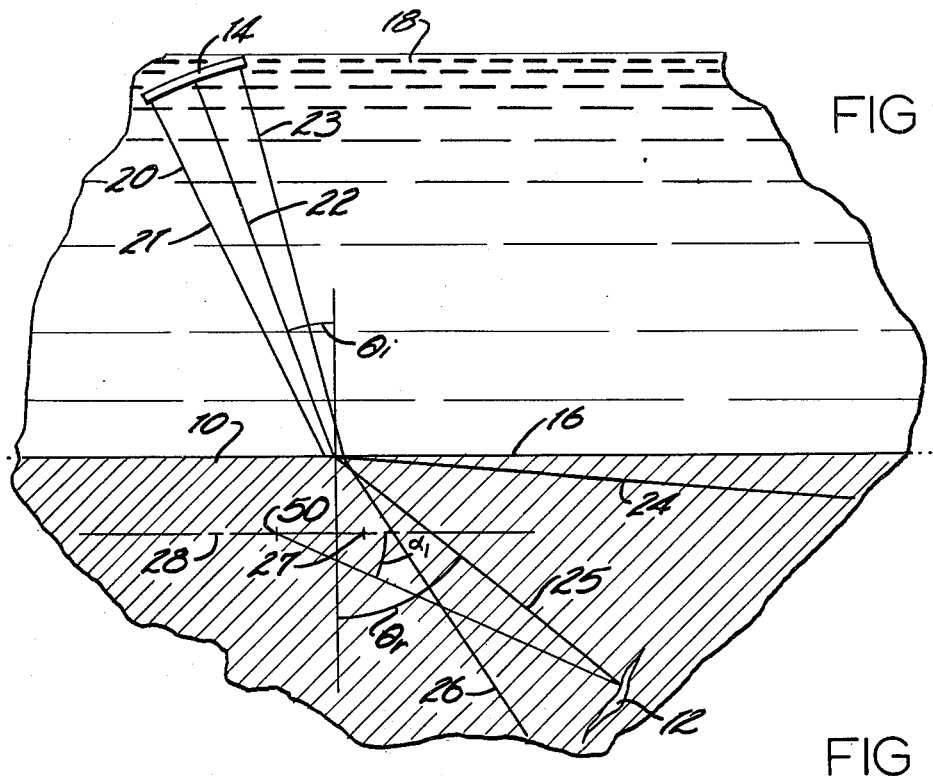
FIG 1
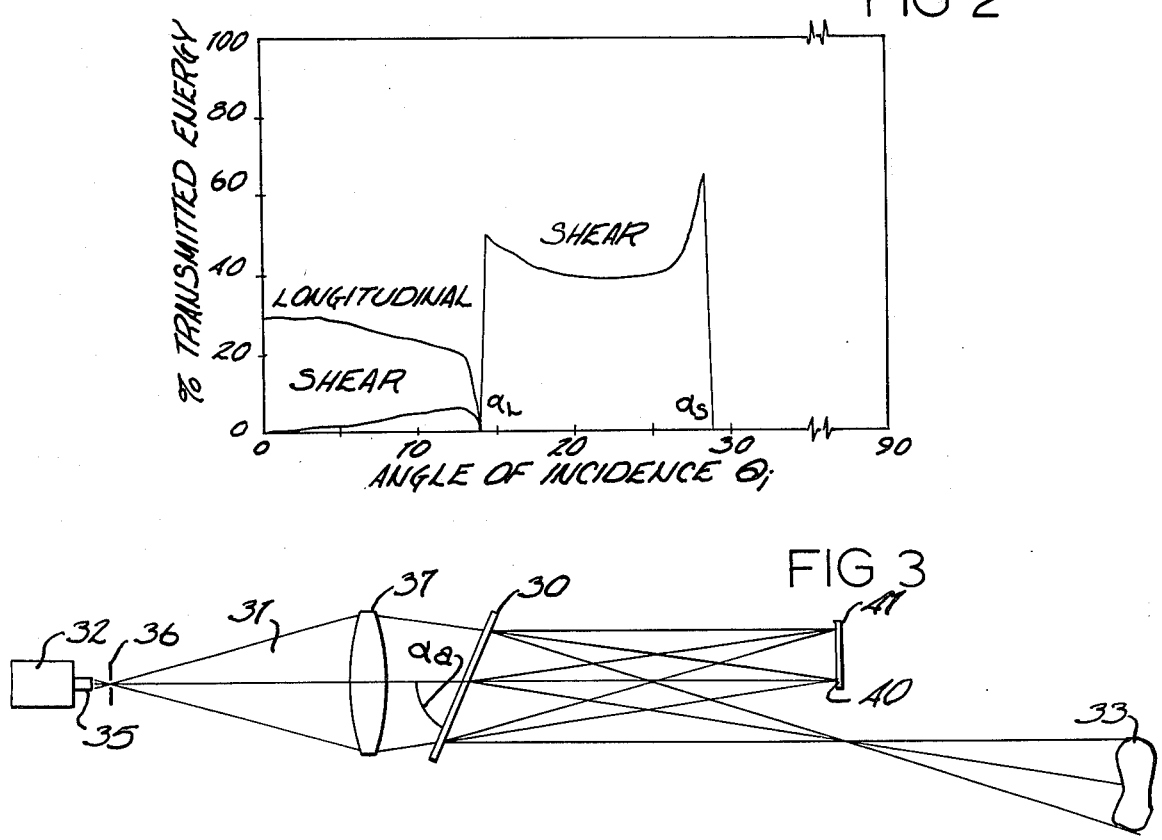
FIG 2
FIG 3

SHEAR WAVE ACOUSTICAL HOLOGRAPHY

BACKGROUND OF THE INVENTION

This invention relates to the field of acoustical holography. More particularly this invention relates to the formation of a hologram by use of shear waves and the reconstruction of an image from such a hologram. The techniques described have application in the field of nondestructive testing, quality control, and quality assurance.

The principles of holography as applied to all forms of radiation are by now well-known. These principles as applied to acoustical radiation are discussed in a book entitled "An Introduction to Acoustical Holography" by Hildebrand and Brenden, published by Plenum Press (1972). The basic acoustical holographic concept is described in the Brenden U.S. Pat. application Ser. No. 569,914, filed Aug. 3, 1966. Liquid surface acoustical holographic techniques are described in Brenden et al U.S. Pat. Nos. 3,564,904 and 3,561,257 and Brenden U.S. Pat. No. 3,585,847. Various scanning acoustical holographic techniques are disclosed in Preston U.S. Pat. No. 3,559,465; Massey U.S. Pat. No. 3,467,216; Neeley et al U.S. Pat. No. 3,640,598; Haines et al U.S. Pat. No. 3,632,183 and Hildebrand U.S. Pat. No. 3,617,754.

Scanning acoustical holographic techniques have particular advantages for investigating the interior of an object having limited access. For example, scanning techniques are particularly advantageous in investigating the integrity of thickwalled high pressure vessels. Since interior access frequently is denied, investigation must be undertaken from the outside. Generally, the transmitting and receiving acoustical transducers are moved parallel with the wall to direct and receive predominantly longitudinal acoustical wave energy into and from the interior of the wall at an angle substantially normal to the wall surface. Generally the investigation is to determine whether any defects such as voids, cracks, discontinuities, or fractures exist in the hidden volume of the wall. Should the defect be a crack or discontinuity on the inside surface, it will generally appear in the reconstructed image as a line. It is generally very difficult to determine the distance or extent that the crack extends into the wall from the interior surface. The hologram image generally only shows what may be termed as a "head on" or "plan" view of the crack taken normal to the exterior surface.

The applicant has discovered a method utilizing acoustical shear waves whereby a "side view" or "transverse profile" of the crack or fracture may be obtained and imaged which is angularly displaced from the normal to the exterior surface.

The use of shear waves in ultrasonic testing is well-known and is discussed in many books and publications. One such book is "Ultrasonic Testing of Materials" by J. Krautkrämer and H. Krautkrämer published by Springer-Verlag, New York (1969). However, to the applicant's knowledge no previous work has been done in which successful use has been made of shear waves in acoustical holography.

One of the principal difficulties encountered is that, unless special techniques are used, both longitudinal and shear waves will be present in the solid material being investigated. The presence of both types of waves leads to confusion in the hologram and in the reconstructed image. Additionally, the shear wave hologram generally yields images with intolerable aberrations.

The existence of aberrations in holographic imaging has been previously generally studied. However, problems associated with source-receiver scanning or shear wave holography have not been investigated to the applicant's knowledge. Pertinent papers dealing generally with aberrations in holographic imaging include "Microscopy by Wave Front Reconstruction," J. Opt. Soc. Am., Vol. 55, 1965, p. 981 (E. N. Leith, J. Upatnicks and K. A. Haines), "Magnification and Third Order Aberrations in Holography," J. Opt. Soc. Am., Vol. 55, 1965, p. 987 (R. W. Meier), "Nonparaxial Imaging, Magnification, and Aberration Properties of Holography," J. Opt. Soc. Am., Vol. 57, 1967, p. 51 (E. B. Champagne), "Computer-Based Analysis of Hologram Imagery and Aberrations" J. Opt. Soc. Am., Vol. 60, 1970, p. 715a (J. N. Latta) and "Investigation of Holographic Techniques," Willow Run Laboratories, University of Michigan (Rep. 2420–21-P) February 1971, (E. N. Lieth and C. M Vest).

One of the principal objects of this invention is to provide an acoustical holographic method which overcomes the disadvantages of using shear waves in holographic imaging while retaining the advantages.

An additional object of this invention is to provide an acoustical holographic method which significantly increases the capabilities and effectiveness of scanning techniques.

A further object of this invention is to provide an acoustical holographic method for forming holograms using shear wave acoustical energy.

An additional object of this invention is to provide an acoustical holographic method for producing images from a shear wave hologram in which the image is substantially aberration free.

A further object of this invention is to provide an acoustical holographic method capable of obtaining greater image resolution than had heretobefore been obtained.

A further object of this invention is to provide an acoustical holographic method whereby a "transverse profile" or "side view" of an object or defect in solid material can be obtained.

A still further object of this invention is to provide an acoustical holographic method that is more efficient in transmitting acoustical energy into and receiving acoustical energy from solid material.

Other and further objects of this invention will be obvious upon an understanding of the illustrative embodiment and various advantages not referred to herein will occur to one skilled in the art upon employment of the invention in practice.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adopted to the particular use contemplated.

As various changes may be made in the form, construction and arrangement of components herein without departing from the spirit and scope of the invention and without sacrificing any of the advantages, it is to be understood that all matter herein is to be interpreted as illustrative and not in a limiting sense.

BRIEF DESCRIPTION OF THE DRAWINGS

A preferred embodiment of this invention is illustrated in the accompanying drawings, in which;

FIG. 1 is a schematic drawing illustrating a scanning technique according to the principles of this invention;

FIG. 2 is a diagram illustrating the percentage of transmission of longitudinal and shear waves of acoustical wave energy at an interface between a liquid and a solid as a function of the incidence angle;

FIG. 3 is a schematic view of a holographic reconstruction system for forming an image from a shear wave hologram;

DESCRIPTION OF A PREFERRED EMBODIMENT

Figure 4:
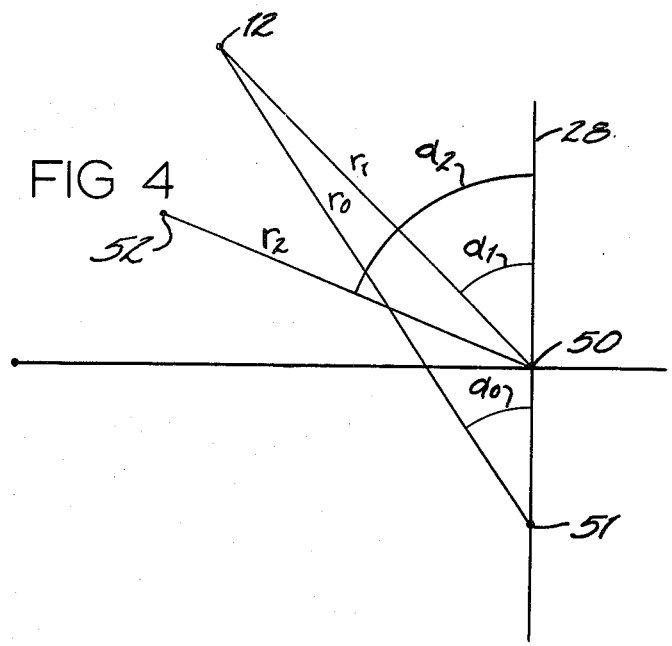
FIG. 4 is a schematic view of a holographic acoustical system displayed for theoretical analysis purposes in determining the parameters related to image astigmatism of a shear wave technique.

In the broad aspect, this invention is concerned with a method of producing holographic information of an object in a volume of solid material. Holographic information is defined as information capable of reconstructing the original object signal and therefore the image of the original object. For purpose of illustration, the solid material is identified with the numeral 10 in FIG. 1. The object is illustrated as a void or discontinuity 12 contained within the solid material.

The first step in the method provides for the insonification of the volume with acoustical wave energy. This may be accomplished by various techniques. In the preferred embodiment a focused transducer 14 is utilized to direct acoustical wave energy into the solid material to insonify the volume and the discontinuity 12. Preferably the transducer is constructed of a piezoelectric ceramic material having a generating surface in the shape of a small segment of a sphere. The sphere has a desired radius of curvature which may be referred to as the focal length of the transducer.

The focused transducer is preferably acoustically coupled to a surface 16 of the solid material through a liquid medium 18. The focused transducer 14 generates a cone 20 of acoustical wave energy that strikes the surface 16. For purposes of illustration, the cone 20 is depicted as having rays 21, 22 and 23 with ray 22 being the center ray and the rays 21 and 23 being the extreme rays.

The angle of incidence $\theta_i$ and the angle of refraction $\theta_r$ of each ray are related by the equation $$\sin\theta_r = \left(\frac{v_r}{v_i}\right) \sin\theta_i$$

where $\theta_i$ is the angle of incidence measured from the normal of the interface, $\theta_r$ is the angle of refraction measured from the normal of the interface, $v_r$ is the velocity of the acoustical wave energy in the solid and the $v_i$ is the velocity of the acoustical wave energy in the liquid coupling medium. Consequently the rays 21, 23 follow refraction paths 24–25 respectively in the solid. The range of possible values for the angles of incidence $\theta_i$ of the extreme rays is however limited by the critical angles of incidence for shear and longitudinal waves respectively. Thus the transmitting transducer 14 should be oriented with respect to the surface 16 so that at least a portion of the acoustical wave energy is refracted into the solid material to insonify the object. The refracted acoustical wave energy is scattered or dispersed by the object and forms an object modified beam which is transmitted through the solid material to a surface. The object modified beam contains at least a portion of the radiation in shear wave form.

Secondly the process provides for scanning the insonified volume with a receiving focused acoustical transducer that is oriented with respect to the surface of a solid material to receive only the radiation from the shear waves of the object modified beam.

Preferably the receiving focused transducer is coupled through a liquid medium to the respective surface of the solid material. Although the receiving transducer and the transmitting transducer may be separate, it is a preferred aspect of this invention to utilize the same transducer 14 for both transmitting and receiving utilizing pulsing techniques. It is a vital aspect of this invention to orient the transducer 14 to receive only the radiation from the shear waves of the object modified beam refracted from the surface 16.

This critical aspect may be more clearly understood by reference to FIG. 2. FIG. 2 is an idealized plot showing the characteristics of energy partition at a liquid-solid interface when the energy is incident from the liquid side. The acoustical energy transmitted from the transducer 14 to the surface 16 is in the form of longitudinal waves as a liquid medium in an extremely poor conductor of shear waves. At angles of incidence $\theta_i$ from 0° to $\alpha_L$ (the critical angle for longitudinal waves), the longitudinal wave energy is converted at the interface surface to both longitudinal and shear wave energy in the solid each of which is propagated into the solid at different angles of refraction. From the standpoint of non shear wave acoustical holography angles of incidence are best restricted to a small range where $\theta_i$ approaches zero so that the energy propagation into the solid is principally in the form of longitudinal waves. However, at an angle of incidence of approximately zero, only a "plan" or "head on" view (normal to the interface) of the object can be obtained. The applicant has found that considerably better results can be obtained by using angles of incidence $\theta_1$ lying between $\alpha_L$ and $\alpha_s$ (critical angle for shear waves) because only one form of wave energy, namely shear wave energy is then propogated into the solid.

If the angle of incidence of ray 21 exceeds the critical angle for shear waves, the shear waves will be totally reflected and not contribute to the insonification or illumination of solid material. If the angle of incidence of ray 23 is less than the critical angle for longitudinal waves, part of the energy will be transmitted into the solid region in the form of longitudinal waves. Some of this energy will be reflected back into the acceptance cone 20 of the transducer 14 thereby degrading the hologram. The resulting hologram will then form spurious images which will cause errors in interpretation of the condition of the solid.

Additionally, it should be noted that between $\alpha_L$ and $\alpha_s$ a greater percentage of the energy is propogated into the solid than at incidence angles between 0 and $\alpha_L$. For the case of aluminum (solid material) with water being used as the liquid coupling medium, $\alpha_L = 13.57°$ and $\alpha_s = 28.73°$. In such a case the acceptance cone 20 of the transducer 14 should ideally be limited so that the incidence angle of ray 23 is greater than 13.57° with the center ray 21 being so directed as to have an angle of incidence of approximately 21.15°. The angle of refraction for shear wave ray 25 is then approximately 48.65°.

The same principle applies when the object modified beam is transmitted from the interior of the solid material back into the coupling liquid. At incidence angles between $\alpha_L$ and $\alpha_s$ only the shear wave energy of the object modified beam is received by the transducer.

Although shear waves scattered or dispersed from the discontinuity 12 in the solid may be partially converted to longitudinal waves in the solid, this does not degrade the resulting hologram because the acceptance cone 20 of the transducer 14 lies outside the range of angles at which the longitudinal waves of the object modified beam can emerge from the solid surface and the transducer will only respond to the shear wave energy. Hence the transducer 14 when properly aligned is essentially "blind" or "deal" to the energy of the longitudinal waves transmitted in the solid material and the longitudinal waves will affect the hologram only to the extent of the side lobe sensitivity of the transducer which is normally orders of magnitude below the sensitivity in the main lobe.

Therefore, it is preferable when using the same receiving and transmitting transducer to direct the cone 20 at an angle with respect to the surface 16 in which the incident angle of each ray is greater than the critical angle of the longitudinal waves to not only insonify the solid material with shear waves but to receive only shear wave energy that is scattered or dispersed from the discontinuity 12.

At the interface 16 the shear wave energy in the solid is partially converted to longitudinal wave energy in the liquid medium and is propagated to the receiver. However, for purposes of simplicity of expression when it is stated that the receiver receives the shear waves of the object modified beam it is understood that the shear waves of the object modified beam in the solid material are converted to longitudinal waves in a liquid coupling medium.

Additionally, it should be understood that the terms "angle of incidence" and "angle of refraction" are being used to broadly to refer to the angles at which the wave energy propagates through the coupling medium and solid material respectively and are related according to the formula previously stated.

All solids having a velocity of propagation for longitudinal waves which is greater than the velocity of propagation in the coupling liquid are suitable for investigation by this method.

The focused transducer 14 is equivalent of a point source and a point receiver located at its focal point 27 (FIG. 1). To operate as both transmitter and receiver, the focused transducer is pulsed at predetermined intervals as the focused transducer is moved in a raster scan fashion over the solid material. The point 27 is scanned in a scan plane or field 28 which may be located in the liquid medium or in the solid material. Although the scan plane 28 over which the point 27 is moved need not be parallel to the surface 16, it is preferable that the scan plane 28 be parallel to the surface 16.

During the receiving cycle, the transducer 14 converts the received acoustical shear wave energy of the object modified beam to an electrical signal. Holographic information is obtained by causing a coherent reference beam of acoustical wave energy to be mixed with the acoustical shear waves received from the discontinuity 12. Alternatively and preferably, the holographic information may be obtained by electronic simulation by mixing the signals from the transducer 14 with a coherent reference electronic signal simulating the reference acoustical beam.

Once the holographic information is obtained, a shear wave hologram 30 may be constructed by several techniques. Examples of presently known techniques of hologram construction are described in patents previously mentioned. Particular reference is made to U.S. Pat. No. 3,632,183.

Preferably, the shear wave acoustical hologram 30 is formed on a photographic transparency in which the holographic information is recorded two-dimensionally in the transparency and visually appears as an interference pattern thereon. Since the wavelength of shear waves is approximately one half that of longitudinal waves in metals, one is able to obtain a two fold increase in resolution in the hologram by utilizing shear waves.

The applicant found, in attempting to reconstruct a shear wave image of the object utilizing previously existing reconstruction techniques, that the formed image was highly distorted or degraded by aberrations rendering the image unsatisfactory for practical use. It has been found that when using previously known techniques, in which the hologram was positioned perpendicular to the optical axis, that the resulting image was highly distorted and unsatisfactory. Through extensive experimentation and trial and error, the applicant discovered a technique by which a satisfactory shear wave image of the object can be formed from a shear wave hologram which eliminates or significantly reduces the most offending aberrations. It was found that the most offending aberration was astigmatism. Applicant discovered that by tilting the hologram 30 to a specific acute angle $\alpha_a$ with respect to the optical axis of the reconstruction system the shear wave image had little or no astigmatism.

The applicant's reconstruction system is illustrated in diagrammatic form in FIG. 3. The shear wave image of the object identified by numeral 33 is formed by illuminating the angularly oriented shear wave hologram 30 with a beam 31 of monochromatic coherent light from a source 32, preferably a laser. Preferably, this system includes a microscope objective lens 35 and a pin hole 36 placed in the path of the beam to expand and remove intensity variations. A lens 37 is placed in the path of the expanding beam to focus the beam 31 and at a distant point 40. The shear wave hologram is positioned in the path of the beam between the lens 37 and the full focus point 40 and at a tilted acute angle $\alpha_a$ with respect to the optical axis of the system that will most effectively reduce the aberrations in the image, particularly the astigmatism. A stop or filter 41 is often used to block the light not contributing to the formation of the true image.

For each shear wave hologram the optimum reconstruction tilting angle $\alpha_a$ of the hologram with respect to the optical axis may be determined experimentally.

The applicant has determined experimentally that when the holographic information that produced the shear wave hologram is obtained by scanning the transducer parallel with the interface 16, then the optimum tilt angle $\alpha_a$ of the shear wave hologram with respect to the reconstruction axis is substantially equal to the angle between the scan plane and a line drawn from the center 50 of the scan plane 28 to the center of the object. This angle is referred to as $\alpha_1$ (FIG. 1). Thus in this situation $\alpha_a \approx \alpha_1$.

In the previous example in which the solid material was aluminum and $\alpha_1 = 45°$ it was determined experimentally that optimum reconstruction results were obtained when this shear wave hologram was tilted to approximately 45°.

It has been found that good reconstruction results can be obtained with acceptable aberrations if the tilt angle $\alpha_a$ is maintained within ±5° of the angle $\alpha_1$.

Such experimental determinations appear to correlate rather closely with theoretical formulations. The theoretical formulations are explained in reference to FIGS. 4 and 5. FIG. 4 illustrates the acoustical system, with line 28 representing the scan plane. For purpose of illustration it is assumed that the center of the object 12 lies at a distance $r_1$ from the center 50 of the scan plane 28 and in a direction $\alpha_1$. Object 12 lies at a distance $r_o$ in the direction $\alpha_o$ from a source location 51. When the source is scanned over a plane parallel to the receiver scan plane 28, point 51 represents the center of the source scan plane. In the case in which the source and the receiver are the same transducer, point 51 coincides with point 50. In the case in which the source and the receiver utilize the same transducer then the source location 51 coincides with the center 50 of the scan plane and $r_o$ equals $r_1$. The reference signal is shown having a source 52 at a distance $r_2$ from center 50 and an angle $\alpha_2$ with respect to plane 28.

Figure 5:
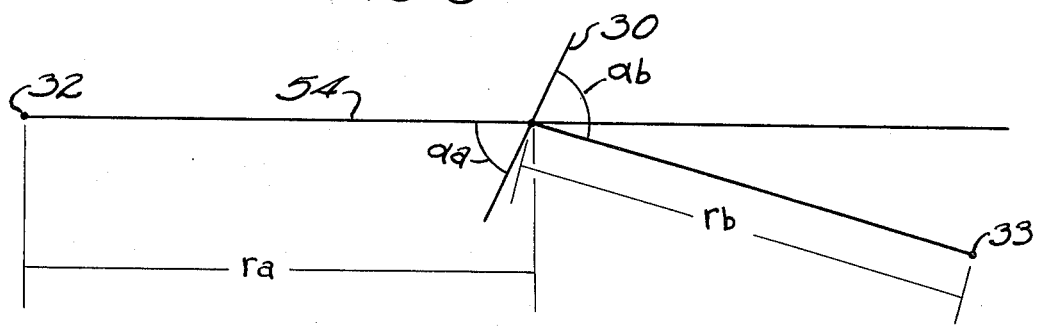
FIG. 5 is a schematic view of a holographic reconstruction system displayed in conjunction with FIG. 4 for theoretical analysis purposes in determining the parameters relating to image astigmatism of the shear wave technique.

The optical reconstruction system is illustrated in FIG. 5 with line 54 representing the optical reconstruction axis and the shear wave hologram identified by the numeral 30. The hologram 30 is illuminated by a coherent point source 32 at a distance $r_a$ from the center of the hologram 30. An image 33 is formed at a distance $r_b$ and at the angle $\alpha_b$ with respect to the hologram 30.

The general mathematical expression for the astigmatism coefficient A whether arising from either longitudinal or shear waves is expressed by the formula:

$$A = \pm \frac{\lambda}{m^2 \Lambda} \left( \frac{\cos^2 \alpha_o}{r_o} + \frac{\cos^2 \alpha_1}{r_1} - \frac{\cos^2 \alpha_2}{r_2} - \frac{\cos^2 \alpha_a}{r_a} - \frac{\cos^2 \alpha_b}{r_b} \right) \quad (1)$$

where $\lambda$ is the wavelength of the reconstructing light, $\Lambda$ is the wavelength of the acoustical wave energy insonifying the object and $m$ is the magnification factor relating dimensions in the hologram to corresponding dimensions in the scan plane. Considering the situation of simultaneous source-receiver scanning. Then $\alpha_o = \alpha_1$ and $r_o = r_1$. Also $$\frac{1}{r_b} = \pm \frac{\lambda}{m^2 \Lambda} \left( \frac{1}{r_o} + \frac{1}{r_1} - \frac{1}{r_2} \right) - \frac{1}{r_a} \quad (2)$$

and $$\cos \alpha_b = \pm \frac{\lambda}{m \Lambda} \left( \cos \alpha_o + \cos \alpha_1 - \cos \alpha_2 \right) - \cos \alpha_a \quad (3)$$

Typical values of the variables are $\lambda/\Lambda = 6.1 \times 10^{-4}$; $r_1 = 0.125$ meters; $r_2 = \infty$; $m = 0.25$; $\alpha_1 = 45°$ and $\alpha_2 = 90°$; $\alpha_o = \alpha_1$. For extrapolation purposes, to determine the relative magnitudes for each term, equations (2) and (3) reduce to the following when utilizing the above listed typical values:

$$\cos \alpha_a + \cos \alpha_b = \pm 0.00345 \quad (4)$$

$$\frac{1}{r_a} + \frac{1}{r_b} = \pm 0.01562 \text{ meters} \quad (5)$$

Use of the minus sign yields results characteristic of the true image whereas use of the plus sign yields results characteristic of the conjugate image.

When the value 0.00345 of equation (4) is quite small compared to $\cos \alpha_a$ as it usually is equation (4) may be written $$\cos \alpha_b \approx -\cos \alpha_a \quad (6)$$

According to equation 5, a true image may be formed at a distance of 10 meters from the hologram when the hologram is spaced at a distance $$r_a = -3.904 \text{ meters} \quad (7)$$

from the point source.

Based on these general relationships equation (1) may be reduced to:

$$A = \pm \left( \frac{\lambda}{m^2 \Lambda} \right) \left( \frac{2}{r_1} \right) \cos^2 \alpha_1 - \left( \frac{1}{r_a} + \frac{1}{r_b} \right) \cos^2 \alpha_a \quad (8)$$

or by reference to equation 2 with $r_o = r_1$ $$A = \pm \left( \frac{2}{r_1} \right) \left( \frac{\lambda}{m^2 \Lambda} \right) (\cos^2 \alpha_a - \cos^2 \alpha_1) \quad (9)$$

Equation 9 shows that theoretically the astigmatism will be eliminated for either longitudinal or shear waves if the hologram is tilted to an angle $\alpha_a$ that is substantially equal to the angle $\alpha_1$ that the object lies in relation to the center 50 of the scanning plane 28.

The correlation between theoretical analysis and experimental observations appears to be quite close. However, it should be appreciated that such a correction is only valid for a limited object field.

It should be understood that variations of the applicant's invention are possible and that the above described embodiment of practicing this invention is presented as an example only and is not intended to limit the true scope of this invention as defined in the following claims:

I claim:

1. In a method of producing holographic information of an object located in a volume of solid material having an exterior surface;

insonifying the volume with acoustical wave energy to produce an object modified beam of acoustical wave energy containing shear waves;

scanning the volume with a focused acoustical transducer directed toward the exterior surface at an angle of incidence thereto to receive only the shear wave energy of the object modified beam;

producing a shear wave hologram of the object from the received shear wave radiation of the object modified beam;

illuminating the shear wave hologram with a beam of coherent light to produce an optical image of the object; and tilting the hologram at an acute angle with respect to the light beam to reduce image aberrations.

2. In the method as defined in claim 1 wherein the volume is insonified by scanning the volume with a source acoustical wave energy beam that is directed toward the exterior surface at an incidence angle greater than the critical angle of incidence of longitudinal waves of the energy to transmit only shear waves of the source energy beam into the volume.

3. In the method as defined in claim 2 wherein the source beam is pulsed at selected intervals.

4. In the method as defined in claim 2 wherein the focused acoustical transducer serves both to generate the source beam and to receive the object modified beam.

5. In the method as defined in claim 1 wherein the focused acoustical transducer is scanned in a scan plane that forms an object angle with respect to a line through the center of the object and the center of the scan plane and wherein the hologram is tilted to an acute angle with respect to the optical axis of the reconstruction system substantially equal to the object angle.

6. In the method as defined in claim 5 wherein the magnitude of the acute angle of the hologram measured with respect to the optical axis of the reconstruction system is within ±5° of the magnitude of the acute object angle.

7. In a method for forming a visual image of an object contained in a solid material from a shear wave acoustical hologram produced from shear wave radiation received from the object;

illuminating the shear wave acoustical hologram with a beam of coherent light to form an optical image of the object; and tilting the shear wave acoustical hologram at an acute angle with respect to the light beam to reduce image aberrations normally produced by the shear wave acoustical hologram.

8. In the method as defined in claim 7 wherein the shear acoustical hologram was constructed by scanning an acoustical transducer in a scan plane to receive shear wave radiation reflected from the object within a selected range of angles of refraction with respect to a surface of the solid material and wherein the acoustical hologram is tilted to an acute angle substantially equal to the angle that a line drawn from the center of the object to the center of the scan plane makes with the scan plane.

9. A method for producing a holographic image of an object contained within a volume of solid material having an exterior surface, comprising the steps of:

scanning a focused transmitting and receiving transducer over an area and at an angle of inclination relative to the surface that such that all rays are greater than the critical angle of incidence for longitudinal waves so as to refract only shear wave energy into the volume at angles of refraction related to the incident angles to produce an object modified beam of acoustical shear wave energy directed back to the surface and to receive said object modified beam at said angle of inclination;

producing a shear wave hologram of the object from the received object modified beam;

illuminating the shear wave hologram with a beam of coherent light to produce an optical image of the object; and orienting the hologram at an acute angle with respect to the beam of coherent light that is substantially equal to the angle that a line drawn from the center of the object to the center of the scan plane makes with the scan plane.

* * * * *